United States Patent
Nomura et al.

(10) Patent No.: US 9,762,154 B2
(45) Date of Patent: Sep. 12, 2017

(54) CONTROL SYSTEM FOR ELECTRIC ROTATING MACHINE

(71) Applicant: DENSO CORPORATION, Kariya, Aichi-pref. (JP)

(72) Inventors: Tetsuya Nomura, Kariya (JP); Takeshi Itoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/084,014

(22) Filed: Mar. 29, 2016

(65) Prior Publication Data

US 2016/0336885 A1 Nov. 17, 2016

(30) Foreign Application Priority Data

May 13, 2015 (JP) ................. 2015-098367

(51) Int. Cl.
| | |
|---|---|
| *H02P 6/08* | (2016.01) |
| *H02P 27/08* | (2006.01) |
| *H02M 7/5395* | (2006.01) |
| *H02M 1/00* | (2006.01) |

(52) U.S. Cl.
CPC ............ *H02P 6/08* (2013.01); *H02M 7/5395* (2013.01); *H02P 27/08* (2013.01); *H02M 2001/007* (2013.01)

(58) Field of Classification Search
CPC ....................................................... H02P 6/28
USPC .................. 318/400.3, 400.01, 700
See application file for complete search history.

(56) References Cited

U.S. PATENT DOCUMENTS

| | | | | |
|---|---|---|---|---|
| 4,785,225 A | * | 11/1988 | Horie ...................... | B60L 9/22 318/778 |
| 7,304,451 B2 | * | 12/2007 | Morimoto ......... | H02M 7/53875 318/801 |
| 8,502,493 B2 | * | 8/2013 | Suhama .................. | H02P 27/04 318/727 |

FOREIGN PATENT DOCUMENTS

| | | |
|---|---|---|
| JP | 2007-020320 A | 1/2007 |
| JP | 5121895 B2 | 1/2013 |

* cited by examiner

*Primary Examiner* — David S Luo
(74) *Attorney, Agent, or Firm* — Oliff PLC

(57) ABSTRACT

A control system for controlling an electric rotating machine includes an inverter for driving the electric rotating machine, a converter that converts an input voltage thereof to an output voltage equal to a step-up command value, and supplies the output voltage to the inverter, a pulse generation section that generates PWM pulses from a carrier for controlling the inverter in accordance with result of comparison between the carrier and a voltage command to the electric rotating machine, and a command generation section that generates the step-up command value. The command generation section includes a command control section that controls the step-up command value such that a modulation factor defined as an amplitude of the voltage command divided by the output voltage of the converter is changed within a predetermined modulation factor range.

8 Claims, 6 Drawing Sheets

US 9,762,154 B2

CONTROL SYSTEM FOR ELECTRIC ROTATING MACHINE

This application claims priority to Japanese Patent Application No. 2015-98367 filed on May 13, 2015, the entire contents of which are hereby incorporated by reference.

BACKGROUND OF THE INVENTION

1. Field of the Invention

The present invention relates to a control system for controlling an electric rotating machine.

There is known a control apparatus configured to reduce noise occurring from a PWM inverter as described, for example, in Japanese Patent No. 5121895. The control apparatus described in this patent reduces the noise of a PWM inverter by changing a carrier frequency randomly to change the on-off pattern of the PWM pulse to thereby spread the switching frequency components of the PWM inverter.

However, when the PWM inverter operates at a high modulation factor where the amplitude of a voltage command is large relative to the system voltage of the PWM inverter, since the amplitude of the voltage command exceeds the carrier amplitude of the voltage command, the frequency that the PWM pulse turns on and off reduces. As a result, the on-off pattern of the PWM pulse becomes almost constant even if the carrier frequency is randomly changed. Hence, it is difficult to sufficiently spread the switching frequency components by randomly changing the carrier frequency when the PWM inverter operates at a high modulation factor.

SUMMARY

An exemplary embodiment provides a control system for controlling an electric rotating machine, including:
  an inverter for driving the electric rotating machine;
  a converter that converts an input voltage thereof to an output voltage equal to a step-up command value, and supplies the output voltage to the inverter;
  a pulse generation section that generates PWM pulses from a carrier for controlling the inverter in accordance with result of comparison between the carrier and a voltage command to the electric rotating machine; and
  a command generation section that generates the step-up command value; wherein
  the command generation section includes a command control section that controls the step-up command value such that a modulation factor defined as an amplitude of the voltage command divided by the output voltage of the converter is changed within a predetermined modulation factor range.

According to the exemplary embodiment, there is provided a control system for controlling an electric rotating machine, capable of reducing the noise of an inverter driven by PWM pulses even when the modulation factor is high.

Other advantages and features of the invention will become apparent from the following description including the drawings and claims.

PREFERRED EMBODIMENTS OF THE INVENTION

First Embodiment

Figure 1:
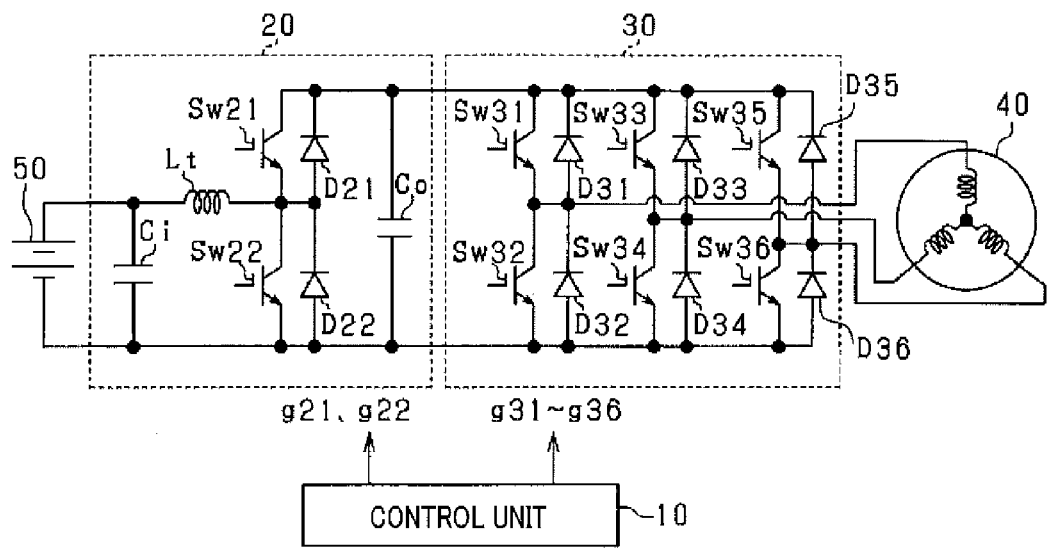
FIG. 1 is a diagram showing the structure of a motor control system according to a first embodiment of the invention.

FIG. 1 is a diagram showing the structure of a motor control system according to a first embodiment of the invention. The motor control system, which is for controlling driving of a motor 40, includes a converter 20, an inverter 30 and a control unit 10.

The motor 40 is a three-phase motor driven by a voltage supplied from the inverter 30.

The converter 20 include an input capacitor Ci connected across the input terminals of the converter 20, a series connection of switches Sw21 and Sw22, a reactor Lt connected between one terminal of the capacitor Ci and the connection node between the switches Sw21 and Sw22, and an output capacitor Co connected across output terminals of the converter 20. The series connection of the switches Sw21 and Sw22 is parallel-connected to the output capacitor Co. The switches Sw21 and Sw22 are parallel-connected with body diodes D31 and D32, respectively. In this embodiment, the switches Sw21 and Sw22 are IGBTs. However, they may be switches other than IGBTs (MOSFETs, for example).

The converter 20 steps up the DC voltage of a battery 50 connected to the input terminals thereof to a voltage equal to a step-up command value, and outputs it to the inverter 30. Accordingly, the output voltage of the converter 20 is a system voltage for the inverter 30. More specifically, the converter 20 converts the DC voltage supplied as an input voltage from the battery 50 into the output voltage equal to the step-up command value when the switches Sw21 and Sw22 are on-off controlled in accordance with manipulation signals g21 and g22 sent from the control unit 10. The manipulation signal g21 and g22 are generated in accordance with the step-up command value by the control unit 10 as gate drive signals to turn and off the switches Sw21 and Sw22 In this embodiment, the modulation factor is the value of the amplitude of the voltage command value to the motor 40 divided by the output voltage of the converter 20.

The inverter 30 is a three-phase inverter that includes a series connection of switches Sw31 and Sw32, a series connection of switches Sw33 and Sw34 and a series connection of switches Sw35 and Sw36. The input terminals of the inverter 30 are connected to the output terminals of the converter 20. The connection nodes of the respective series connections are connected to the windings of the motor 40. The switches Sw31 to Sw36 are connected with body diodes D31 to D36, respectively. In this embodiment, the switches Sw31 to Sw36 are IGBTs. However, they may be switches other than IGBTs (MOSFETs, for example).

The inverter 30 converts the output voltage of the converter 20 into a three-phase current and applies it to the windings of the motor 40 to drive the motor 40 when the switches Sw31 to Sw36 are on-off controlled in accordance with the PWM pulses, respectively. More specifically, the driving of the switches Sw31 to Sw36 are controlled by the manipulation signals g31 to g36 sent from the control unit 10 so that the voltage command is applied to the windings of the motor 40. The PWM pulses, which are generated in accordance with the voltage command to the motor 40 by the control unit 10, are pulses for turning on and off the switches Sw 31 to Sw36. The manipulation signals g31 to g36 are gate drive signals generated by the control unit 10 such that the on/off patterns of the switches Sw31 to Sw36 correspond to the on-off patterns of the PWM pulses.

The control unit 10 is constituted mainly of a microcomputer including a CPU, a ROM, a RAM and an I/O module. The functions of a command generation section and a pulse generation section described below are implemented by programs stored in the ROM and executed by the CPU.

The command generation section generates a step-up command value to be commanded to the converter 20. Further, the command generation section generates the manipulation signal g21 and g22, and applies them to the gate terminals of the switches Sw21 and Sw22 so that the output voltage of the converter 20 becomes equal to the step-up command value.

Figure 2:
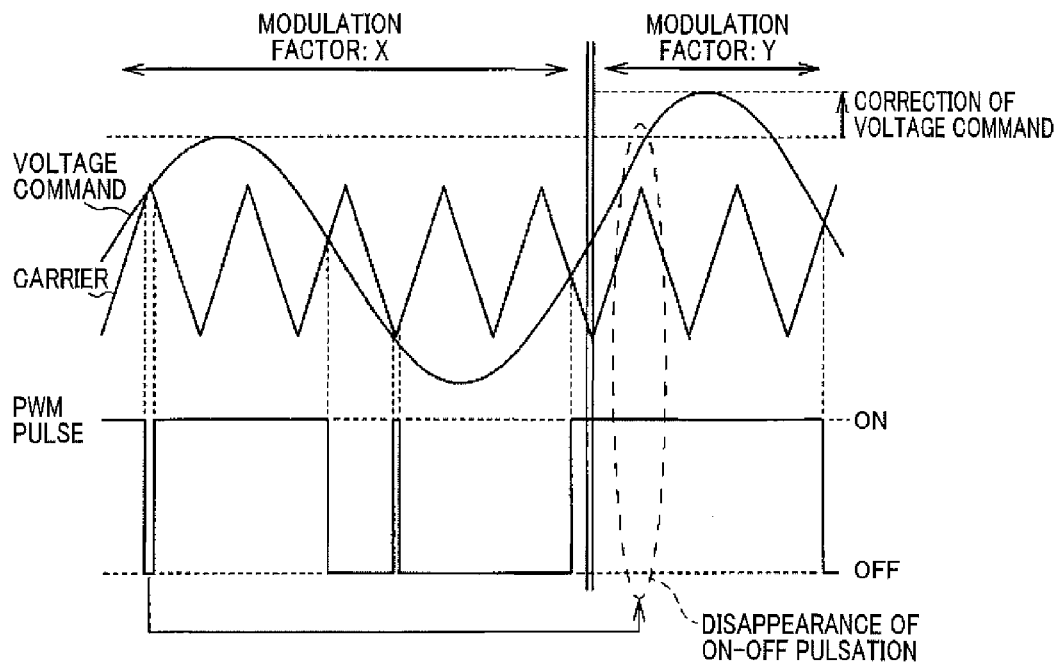
FIG. 2 is a diagram showing an example of the PWM pulse pattern in the control system according to the first embodiment of the invention.
Figure 3:
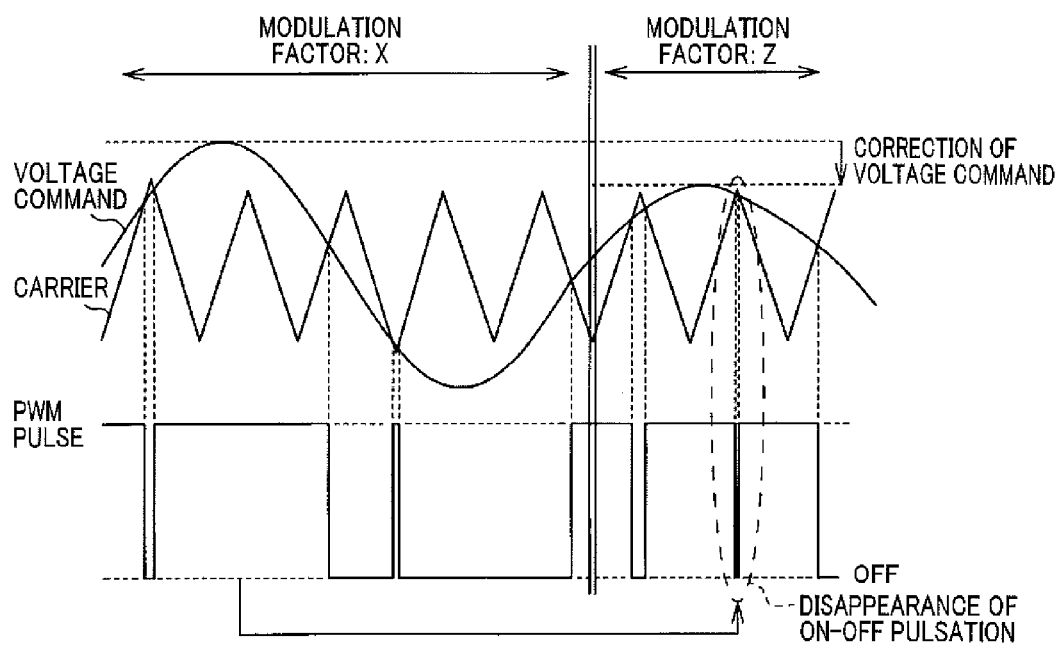
FIG. 3 is a diagram showing another example of the PWM pulse pattern in the control system according to the first embodiment of the invention.

As shown in FIGS. 2 and 3, the pulse generation section generates the PWM pulses to control the inverter 30 based on results of the comparison between the carrier and the voltage command corrected in accordance with the modulation factor. Further, the pulse generation section generates the manipulation signals g31 to g36 based on the generated PWM pulses and applies them to the gate terminals of the switches Sw31 to Sw36. The voltage command to the motor 40 is calculated based on a command value of a controlled variable of the motor 40 sent from a higher control unit. The controlled variable of the motor 40 may be a torque.

Figure 4:
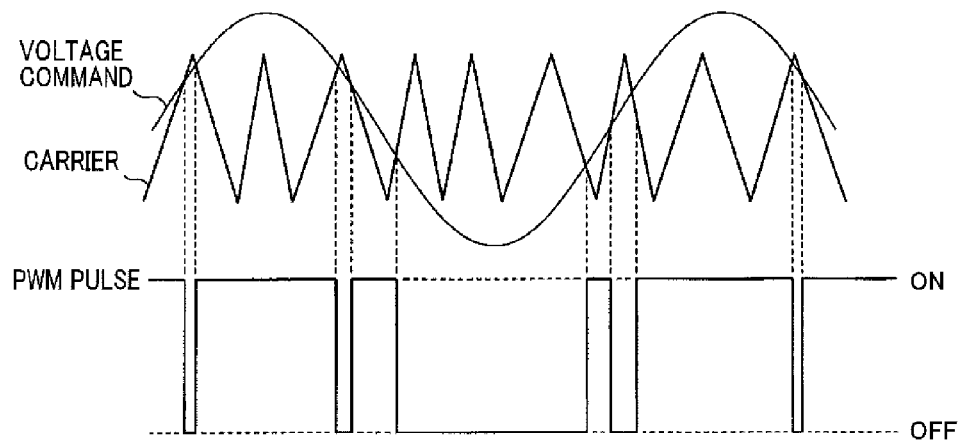
FIG. 4 is a diagram showing an example of the PWM pulse pattern in a conventional control system.

Conventionally, to spread the switching frequency components which cause the noise of a PWM inverter, the carrier frequency is randomly changed to change the on-off patterns of the PWM pulses. However, when the PWM inverter operates at a high modulation factor as shown in FIG. 4, since the amplitude of the voltage command exceeds the carrier amplitude, the frequency that the PWM pulses turn on and off reduces. As a result, the on-off pattern of the PWM pulses is seldom changed. Hence, when the PWM inverter operates at a high modulation factor, since the switching frequency components cannot be sufficiently spread, the noise may not be sufficiently reduced.

The inventors of the present invention focused on the fact that the on/off patterns of the PWM pulses can be changed even when the modulation factor is high by changing the modulation factor as shown in FIGS. 2 and 3.

FIG. 2 shows the voltage command, the carrier and the PWM pulses when the torque command to the motor 40 is constant in the case where the system voltage of the inverter 30 is reduced. The modulation factor is X before the system voltage is reduced and is Y (X<Y) after the system voltage is reduced. Both X and Y are larger than 100%. After the modulation factor is increased, the amplitude of the voltage command is increased to compensate the torque command. Since an on/off pulsation which is present before the modulation factor is increased disappears after the system voltage is reduced to increase the modulation factor as shown in FIG. 2, the on-off pattern of the PWM pulses is changed. That is, by changing the modulation factor from X to Y, the pulse pattern can be changed.

FIG. 3 shows the voltage command, the carrier and the PWM pulses when the torque command to the motor 40 is constant in the case where the system voltage of the inverter 30 is increased. The modulation factor is X before the system voltage is increased and is Z (X>Z) after the system voltage is increased. Both X and Z are larger than 100%. After the modulation factor is reduced, the amplitude of the voltage command is reduced to compensate the torque command. Since an on/off pulsation which is not present before the modulation factor is reduced appears after the system voltage is increased to reduce the modulation factor as shown in FIG. 3, the on-off pattern of the PWM pulses is changed. That is, by changing the modulation factor from X to Z, the pulse pattern can be changed. As explained above, the on-off pattern of the PWM pulses can be changed even when the modulation factor is high by changing the modulation factor.

Therefore, in this embodiment, the modulation factor is changed. To change the modulation factor, the system voltage of the inverter 30 has to be variable. Accordingly, the motor control system of this embodiment includes the converter 20 so that the modulation factor can be changed by controlling the step-up command value to be commanded to the converter 20. FIG. 2 shows the case where the system voltage is reduced by reducing the step-up command value. FIG. 3 shows the case where the system voltage is increased by increasing the step-up command value.

The command generation section includes a command control section which controls the step-up command value to be commanded to the converter 20 such that the modulation factor is changed within a predetermined modulation factor range (between 115 and 125%, for example). When the modulation factor range is higher, the system voltage is smaller and the loss in the converter 20 is smaller.

Figure 5:
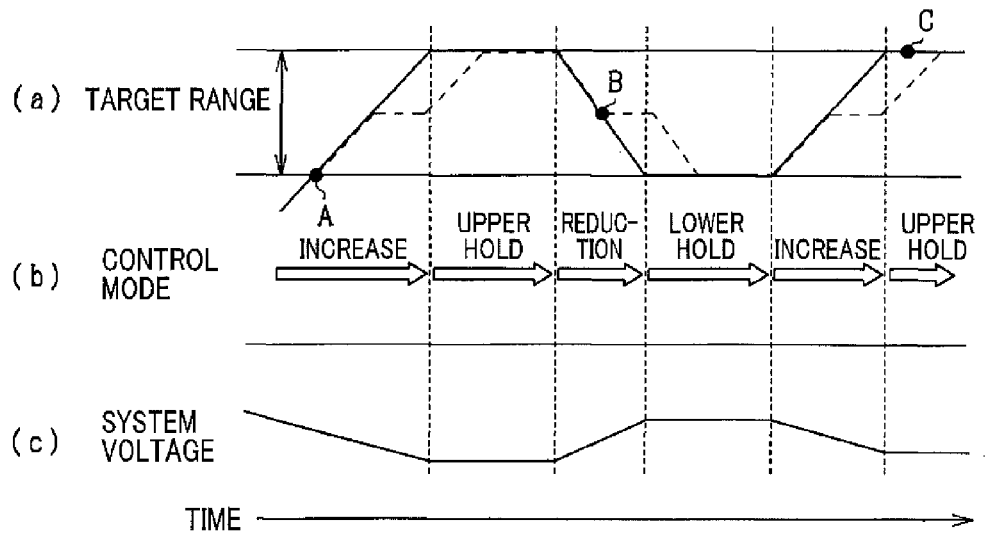
FIG. 5 is a time chart showing an example of temporal changes of (a) a modulation factor within a target modulation factor range, (b) a control mode and (c) a system voltage after being stepped up in the motor control system according to the first embodiment of the invention.
Figure 6:
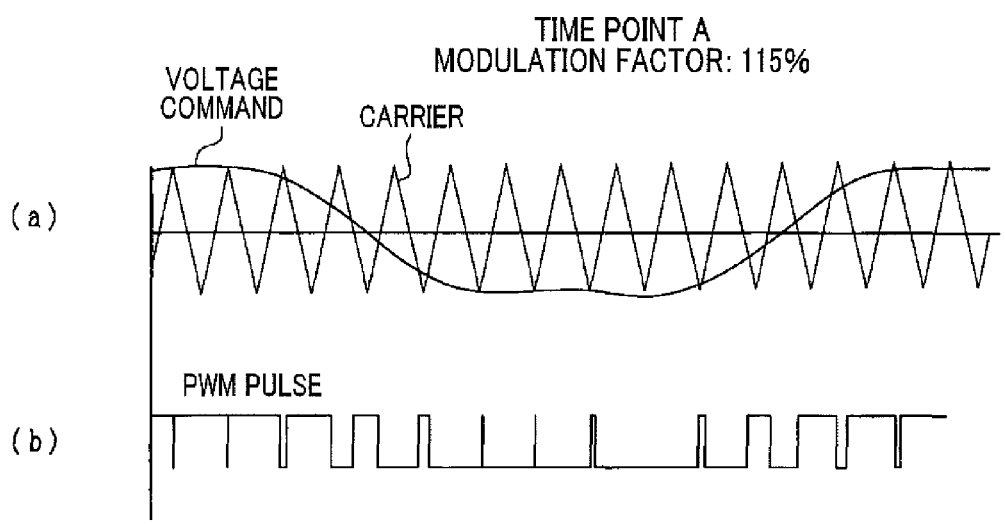
FIG. 6 is a time chart showing (a) a voltage command and a carrier and (b) the PWM pulse at time point A in FIG. 5 enlarged along time axis.
Figure 7:
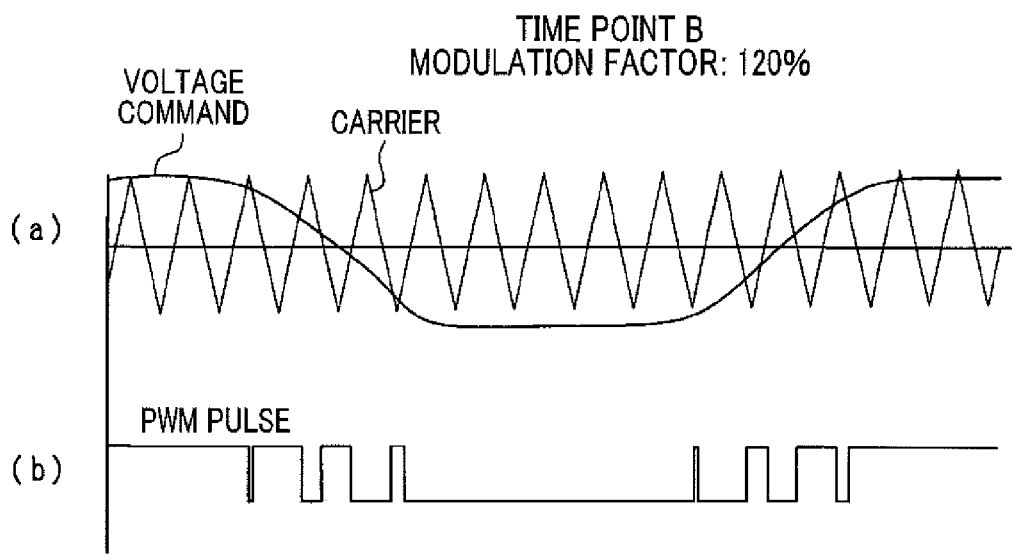
FIG. 7 is a time chart showing (a) the voltage command and the carrier and (b) the PWM pulse at time point B in FIG. 5 enlarged along time axis.
Figure 8:
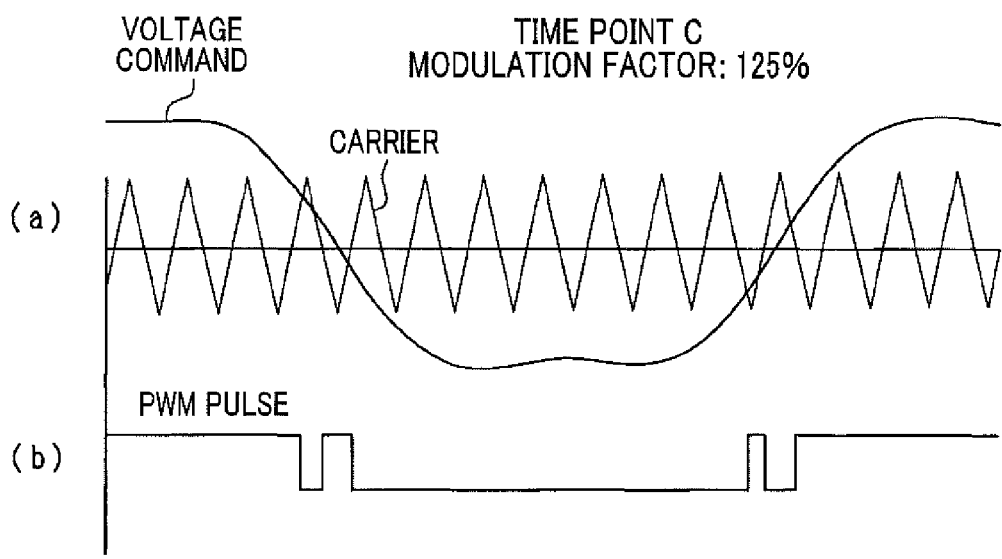
FIG. 8 is a time chart showing (a) the voltage command and the carrier and (b) the PWM pulse at time point C in FIG. 5 enlarged along time axis.

Next, the command control section is explained in detail with reference to FIGS. 5 to 8. FIG. 5 is a time chart showing an example of temporal changes of (a) the modulation factor, (b) the control mode and (c) the system voltage when the torque command value commanded to the motor 40 is constant. FIGS. 6 to 8 are time charts showing (a) the command voltage and the carrier and (b) the PWM pulses at time point A, B and C, respectively, in FIG. 5 enlarged along time axis. The time point A is a point of time when the modulation factor is at the lower limit of the predetermined modulation factor range, the time point B is a point of time when the modulation factor is somewhere between the lower limit and the upper limit of the modulation factor range, and the time point C is a point of time when the modulation factor is at the upper limit of the modulation factor range. The control mode, which is a mode of change of the modulation factor, includes an increase mode, an upper hold mode, a reduction mode and a lower hold mode.

In the increase mode to increase the modulation factor, the command control section reduces the step-up command value gradually (step by step) by a predetermined reduction amount when the modulation factor is smaller than the lower limit of the modulation factor range. If the voltage command to the motor 40 is constant, the modulation factor increases gradually by a predetermined increase amount as the step-up command value is reduced gradually by the reduction amount. FIG. 6 shows the increase mode. In the increase mode, the change period of the PWM pulse pattern can be adjusted by adjusting the reduction amount.

In the reduction mode to reduce the modulation factor, the command control section increases the step-up command value gradually by a predetermined increase amount when the modulation factor is larger than the lower limit of the modulation factor range. If the voltage command to the motor 40 is constant, the modulation factor reduces gradually by a predetermined reduction amount as the step-up command value is increased gradually by the increase amount. FIG. 7 shows the reduction mode. In the reduction mode, the change period of the PWM pulse pattern can be adjusted by adjusting the increase amount. The increase amount may be or may not be the same as the reduction amount.

The command control section maintains the step-up command value constant during an upper limit maintenance period after the modulation factor reaches the upper limit of the modulation factor range. If the voltage command to the motor 40 is constant, the modulation factor can be maintained at the upper limit by maintaining the step-up command value constant.

FIG. 8 shows the upper hold mode. The provision of the upper hold mode increases the design flexibility of the change period of the PWM pulse pattern when the modulation factor is changed within the modulation factor range.

The command control section maintains the step-up command value constant during a lower limit maintenance period after the modulation factor reaches the lower limit of the modulation factor range. If the voltage command to the motor 40 is constant, the modulation factor can be maintained at the lower limit by maintaining the step-up command value constant. The provision of the lower hold mode increases the design flexibility of the change period of the PWM pulse pattern when the modulation factor is changed within the modulation factor range. The lower limit maintenance period may be or may not be the same as the upper limit maintenance period.

By changing the modulation factor within the modulation factor range, the PWM pulse pattern can be changed and the switching frequency can be spread. Further, by setting the change period of the modulation factor appropriately, the switching frequency is spread appropriately and the effect of noise reduction increases. In this embodiment, the change period of the modulation factor can be adjusted appropriately to reduce the noise by adjusting the increase amount, reduction amount, upper limit maintenance period or lower limit maintenance period.

The pulse generation section generates the PWM pulses based on the results of comparison between the carrier and the voltage command to the motor 40 when the modulation factor is smaller than a predetermined modulation factor threshold. If the modulation factor exceeds the modulation factor threshold, the control unit 10 controls the inverter 30 using rectangular pulses instead of the PWM pulses. The modulation factor threshold is set to 127% for example. When the voltage command to the motor 40 is changed while the modulation factor is changed within the modulation factor range, the control unit 10 controls the step-up command value such that the modulation factor continued to be changed within the range modulation factor range.

Figure 9:
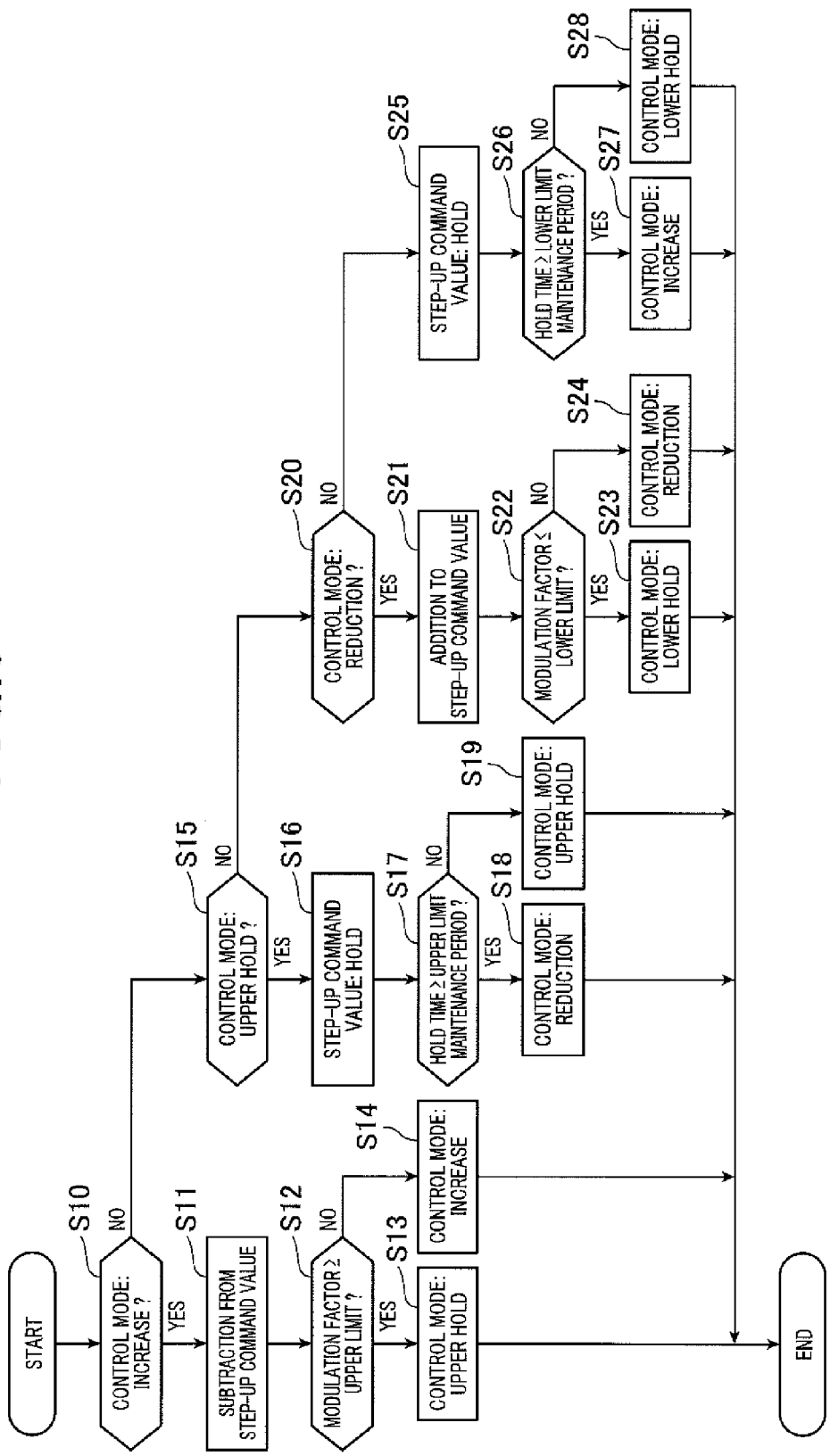
FIG. 9 is a flowchart showing steps of a process for changing the modulation factor in the motor control system according to the first embodiment.

Next, a process for changing the modulation factor is explained with reference to the flowchart of FIG. 9. The process is performed at regular time intervals by the control unit 10 when the modulation factor is within the predetermined modulation factor range.

The process begins in step S10 where it is determined whether or not the control mode is in the increase mode. Initially, the control mode is set to the increase mode or reduction mode. If the determination result in step S10 is affirmative, the process proceeds to step S11 where the predetermined reduction amount is subtracted from the current step-up command value. As a result, if the voltage command to the motor 40 is constant, the modulation factor increases. In subsequent step S12, it is determined whether or not the modulation factor is larger than the upper limit of the predetermined modulation factor range. If the determination result in step S12 is affirmative, the process proceeds to step S13 where the control mode is set to the upper hold mode. On the other hand, if the determination result in step S12 is negative, the process proceeds to step S14 where the control mode is set continuously in the increase mode.

If the determination result in step S10 is negative, the process proceeds to step S15 where it is determined whether or not the control mode is in the upper hold mode. If the determination result in step S15 is affirmative, the process proceeds to step S16 where the step-up hold value is held at a constant value. Accordingly, if the voltage command to the motor 40 is constant, the modulation factor is maintained at the upper limit. In subsequent step S17, it is determined whether or not the hold time (the period during which the step-up hold value has been held at the constant value) has exceeded the upper limit maintenance period. If the determination result in step S17 is affirmative, the process proceeds to step S18 where the control mode is set to the reduction mode. On the other hand, if the determination result in step S17 is negative, the process proceeds to step S19 where the control mode is set continuously in the upper hold mode.

If the determination result in step S15 is negative, the process proceeds to step S20 where it is determined whether or not the control mode is in the reduction mode. If the determination result in step S20 is affirmative, the process proceeds to step S21 where the predetermined increase amount is added to the current step-up command value. Accordingly, if the voltage command to the motor 40 is constant, the modulation factor starts to reduce. In subsequent step S22, it is determined whether or not the modulation factor is smaller than the lower limit of the modulation factor range. If the determination result in step S22 is affirmative, the process proceeds to step S23 where the control mode is set to the lower hold mode. On the other hand, if the determination result in step S22 is negative, the process proceeds to step S24 where the control mode is set continuously in the reduction mode.

If the determination result in step S20 is negative, the process proceeds to step S25 where the step-up command value is held at a constant value because the control mode is in the lower reduction mode. Accordingly, if the voltage command to the motor 40 is constant, the modulation factor is maintained at the lower limit. In subsequent step S26, it is determined whether or not the hold time has exceeded the lower limit maintenance period. If the determination result in step S26 is affirmative, the process proceeds to step S27 where the control mode is set to the increase mode. On the other hand, if the determination result in step S26 is negative, the process proceeds to step S28 where the control mode is set continuously in the lower hold mode. Then, this process is terminated.

The first embodiment described above provides the following advantages.

Since the step-up command value for the converter 20 is controlled such that the modulation factor is changed within the predetermined modulation factor range to change the on-off pattern of the PWM pulses, the switching frequency can be spread appropriately to reduce the noise.

The modulation factor can be increased simply by reducing the output voltage gradually by the predetermined reduction amount. Further, the increase rate of the modulation factor can be changed simply by changing the value of the predetermined reduction amount. Accordingly, the PWM pulse pattern can be generated so as to have a period appropriate to reduce the noise by adjusting the reduction amount.

The modulation factor can be reduced simply by increasing the output voltage gradually by the predetermined increase amount. Further, the reduction rate of the modulation factor can be changed simply by changing the value of the predetermined increase amount. Accordingly, the PWM pulse pattern can be generated so as to have a period appropriate to reduce the noise by adjusting the increase amount.

After the modulation factor reaches the upper limit of the modulation factor range, the step-up command value is maintained constant to maintain the modulation factor constant during the upper maintenance period. Accordingly, since the design flexibility of the change period of the modulation factor increases, the design flexibility of the change period of the PWM pulse pattern increases. As a result, the PWM pulse pattern can be generated so as to have a period appropriate to reduce the noise by adjusting the upper limit maintenance period.

After the modulation factor reaches the lower limit of the modulation factor range, the step-up command value is maintained constant to maintain the modulation factor constant during the lower limit maintenance period. Accordingly, since the design flexibility of the change period of the modulation factor increases, the design flexibility of the change period of the PWM pulse pattern increases. As a result, the PWM pulse pattern can be generated so as to have a period appropriate to reduce the noise by adjusting the lower limit maintenance period.

Second Embodiment

Figure 10:
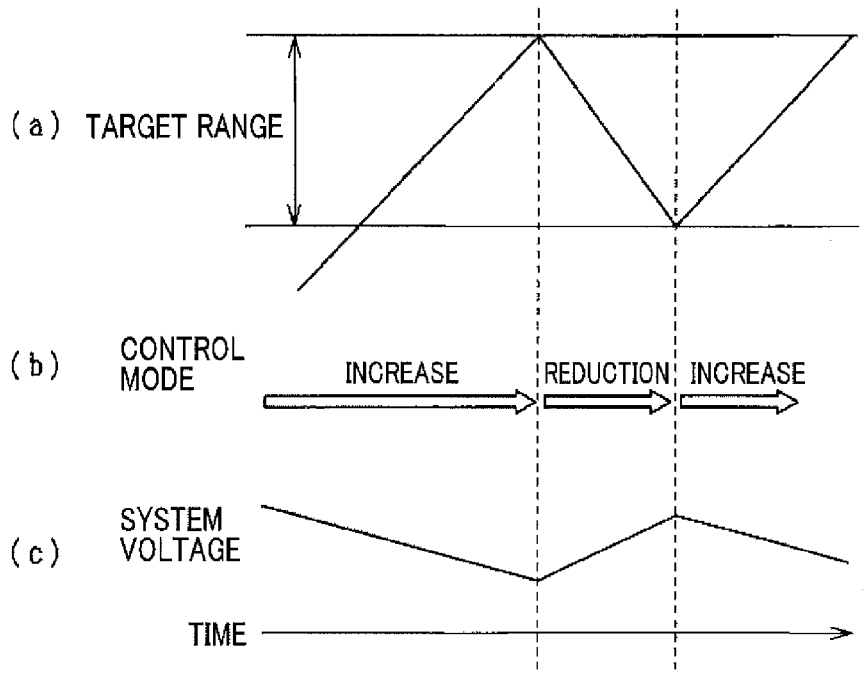
FIG. 10 is a time chart showing an example of temporal changes of (a) the modulation factor within a target modulation factor range, (b) the control mode and (c) the system voltage after being stepped up in a motor control system according to a second embodiment of the invention.
Figure 11:
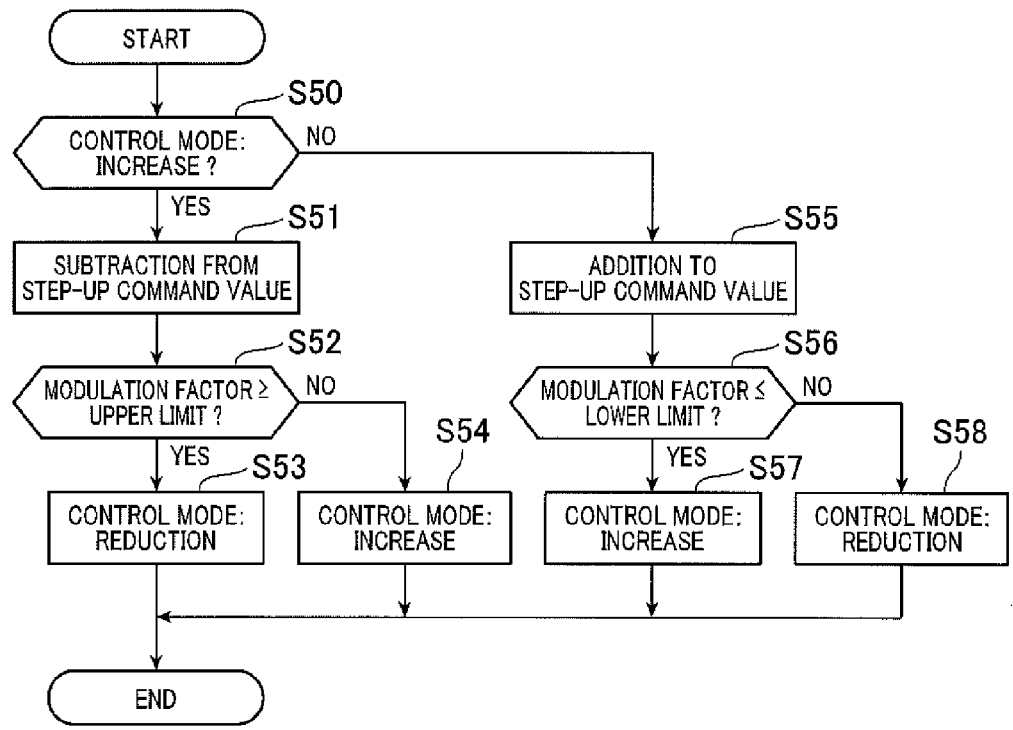
FIG. 11 is a flowchart showing steps of a process for changing the modulation factor in the motor control system according to the second embodiment of the invention.

Next a motor control system according to a second embodiment of the invention is described with reference to FIGS. 10 and 11 with a focus on differences with the first embodiment. FIG. 10 is a time chart showing an example of temporal changes of (a) the modulation factor within a target modulation factor range, (b) the control mode and (c) the system voltage after being stepped up. As shown in FIG. 10, in this embodiment, the control mode includes only the increase mode and the reduction mode. Accordingly, the modulation factor starts to reduce immediately when it reaches the upper limit of the predetermined modulation factor range without being maintained at the upper limit, and starts to increase immediately when it reaches the lower limit of the modulation factor range without being maintained at the lower limit.

Next, a process for changing the modulation factor in the second embodiment is explained with reference to the flowchart of FIG. 11. The process is performed at regular time intervals by the control unit 10 when the modulation factor is within the predetermined modulation factor range.

In this process, steps S50 to S54 which are the same as steps S10 to S14 described above are performed in the beginning. After that, it is determined whether or not the control mode is in the increase mode in step S50. If the determination result in step S50 is negative, the process proceeds to step S55 where the predetermined increase amount is added to the current step-up command value. In subsequent step S56 it is determined whether or not the modulation factor is smaller than the lower limit of the modulation factor range. If the determination result in step S56 is affirmative, the process proceeds to step S57 where the control mode is set to the increase mode. On the other hand, if the determination result in step S56 is negative, the process proceeds to step S58 where the control mode is set continuously in the reduction mode. Then, this process is terminated.

According to the second embodiment described above, although the design flexibility of the change period of the PWM pulse pattern is lower than the first embodiment, the noise can be reduced by appropriately by spreading the switching frequency.

Other Embodiments

The first embodiment may be modified such that, of the upper hold mode and the lower hold mode, only one of them is included in the control mode.

The control mode may further include an intermediate hold mode in which after the modulation factor reaches a predetermined maintenance modulation factor, the step-up command value is maintained constant within the predetermined modulation factor range during a predetermined maintenance period as shown by the broken line in FIG. 5. The intermediate hold mode may be included in place of the upper and lower hold modes, or may be included together with one of the upper and lower hold modes.

In the first and second embodiments, the increase amount and the reduction amount of the step-up command value are constant, so that the modulation factor changes periodically within the predetermined modulation factor range. However, the increase amount and the reduction amount of the step-up command value may be changed randomly, so that the modulation factor changes aperiodically within the predetermined modulation factor range.

The control unit 10 may be provided with a setting section which variably sets a target modulation factor within the predetermined modulation factor range, and the command control section may feedback-control the modulation factor to follow this target modulation factor. By changing the target modulation factor appropriately, the switching frequency can be spread to thereby reduce the noise. The time chart of the modulation factor, the control mode and the system voltage in this case is similar to that shown in FIG. 5 or 10.

The target modulation factor may be changed periodically or aperiodically within the predetermined modulation factor range. In the case of changing the target modulation factor periodically, the PWM pulse pattern can be generated so as to have a change period appropriate to reduce the noise by adjusting the period of the target modulation factor. The converter 20 does not necessarily have to be a step-up converter. The converter 20 may be a step-up/down converter or a step-down converter depending on the voltage of the battery 50.

The motor 40 does not necessarily have to be a three-phase motor. It may be a two-phase motor or a motor having four or more phase windings.

The above described preferred embodiments are exemplary of the invention of the present application which is described solely by the claims appended below. It should be understood that modifications of the preferred embodiments may be made as would occur to one of skill in the art.

What is claimed is:

1. A control system for controlling an electric rotating machine, comprising:
    an inverter for driving the electric rotating machine;
    a converter that converts an input voltage thereof to an output voltage equal to a step-up command value, and supplies the output voltage to the inverter;
    a pulse generation section that generates PWM pulses from a carrier for controlling the inverter in accordance with result of comparison between the carrier and a voltage command to the electric rotating machine; and
    a command generation section that generates the step-up command value; wherein
    the command generation section includes a command control section that controls the step-up command value such that a modulation factor defined as an amplitude of the voltage command divided by the output voltage of the converter is changed within a predetermined modulation factor range.

2. The control system according to claim 1, wherein the command control section gradually reduces the step-up command value by a predetermined reduction amount to increase the modulation factor when the modulation factor is smaller than an upper limit of the predetermined modulation factor range.

3. The control system according to claim 1, wherein the command control section gradually increases the step-up command value by a predetermined increase amount to reduce the modulation factor when the modulation factor is larger than a lower limit of the predetermined modulation factor range.

4. The control system according to claim 1, wherein the command control section maintains the step-up command value constant during a predetermined intermediate maintenance period after the modulation factor reaches a predetermined maintenance modulation factor within the predetermined modulation factor range.

5. The control system according to claim 1, wherein the command control section maintains the step-up command value constant during a predetermined upper limit maintenance period after the modulation factor reaches an upper limit of the predetermined modulation factor range.

6. The control system according to claim 1, wherein the command control section maintains the step-up command value constant during a predetermined lower limit maintenance period after the modulation factor reaches a lower limit of the predetermined modulation factor range.

7. The control system according to claim 1, further comprising a setting section that variably sets a target modulation factor within the predetermined modulation factor range, the command control section feedback-controlling the modulation factor to follow the target modulation factor in accordance with the step-up control value.

8. The control system according to claim 7, wherein the setting section periodically changes the target modulation factor.

* * * * *